(12) United States Patent
Schill et al.

(10) Patent No.: US 6,623,015 B2
(45) Date of Patent: Sep. 23, 2003

(54) CLAMPING CHUCK

(75) Inventors: Albrecht Paul Schill, Stockholm (SE); Björn Pettersson, Järfälla (SE)

(73) Assignee: System 3R International AB, Vallingby (SE)

( * ) Notice: Subject to any disclaimer, the term of this patent is extended or adjusted under 35 U.S.C. 154(b) by 32 days.

(21) Appl. No.: 09/933,871

(22) Filed: Aug. 22, 2001

(65) Prior Publication Data

US 2002/0027329 A1 Mar. 7, 2002

(30) Foreign Application Priority Data

Aug. 25, 2000 (DE) .......................... 100 41 844

(51) Int. Cl.[7] .............................. B23B 31/22
(52) U.S. Cl. ................ 279/71; 82/160; 409/233; 219/69.15
(58) Field of Search .................. 279/72, 74, 75, 279/71, 81, 82, 22, 29–30, 89; 409/232–234; 219/69.15; 403/322.1, 322.2, 325, DIG. 6; 188/67, 68, 80; 82/160

(56) References Cited

U.S. PATENT DOCUMENTS

| | | | | |
|---|---|---|---|---|
| 3,741,573 A | * | 6/1973 | Treer | ............. 279/81 |
| 4,615,688 A | | 10/1986 | Schneider | |
| 4,855,558 A | | 8/1989 | Ramsbro | |
| 5,791,803 A | | 8/1998 | Nordquist | |
| 6,485,214 B2 | * | 11/2002 | Schill | ......... 403/322.2 |

* cited by examiner

*Primary Examiner*—Steven C. Bishop
(74) *Attorney, Agent, or Firm*—Jacobson Holman PLLC

(57) ABSTRACT

A clamping chuck having a central receptacle and a disk arranged around the receptacle and which may be moved from a clamping position, whereby a draw bar inserted into the receptacle is clamped, to a releasing position wherein a draw bar is released from being clamped. The disk has a locking mechanism including a plurality of locking elements which are equally spaced in a circumferential direction. The draw bar is coupled to a brake such that the braking force of the brake is proportional to a pull on the draw bar. Thus, a high axial load on the draw bar causes a high braking force and a low load results in a low braking force.

11 Claims, 5 Drawing Sheets

CLAMPING CHUCK

TECHNICAL FIELD

The invention refers to a clamping chuck having a central receptacle and a disk which surrounds the receptacle and which may be moved to a clamping position wherein a drawbar inserted into the receptacle is clamped, and to a releasing position wherein the drawbar is released, the disk comprising a catch mechanism having circumferentially equally spaced catch elements, the chuck further having a blocking means which aggravates movements of the disk under the influence of an axial load on the clamped drawbar.

DESCRIPTION OF RELATED ART

The document EP 0255042 discloses a clamping chuck which is equipped with a ball catch having a plurality circumferentially equally spaced balls wherein for each ball a radial (with respect to the central axis of the receptacle) pocket is provided within a disk surrounding the receptacle. The disk may be transferred from the releasing position to the clamping position by a driving medium, e.g. compressed air. During such transfer the balls are urged radially against the drawbar thereby engaging from below an oblique ring surface of a radial drawbar incut provided near the the end thereof. An automatic return of the balls into the pockets under the influence of an axial load on the drawbar is prevented by the drive means. Only in case the draw bar may be released the disk is no longer under clamping pressure.

The axial load on the draw bar may be high if a workpiece mounted to the draw bar is machined by cutting. The axial load is substantially lower if the workpiece is machined by electroerosion.

Manually operated clamping chucks have a handle which projects to the exterior of a housing through a slot thereof. The handle may be pivoted within a plane which extends transverse to the central axis of a receptacle of the chuck. The handle may be manipulated such that the disk is rotated to its clamping position or such that the disk is rotated to its releasing position. A blocking means is provided which prevents that the disk escapes its clamping position under the influence a high load on the clamped draw bar when the handle is left free. The blocking means may include a brake surface on the disk which is in frictional contact to an inner surface of the housing surrounding the catch mechanism. It is necessary that the disk is held safely in its clamping position for ensuring that the draw bar remains fixedly clamped under all operating conditions. The brake force developed by the blocking means should therefore be sufficiently great. A high brake force, however, aggravates manual manipulation of the handle and, apart therefrom is not necessary for electroerosive machining of the workpiece.

BRIEF SUMMARY OF THE INVENTION

It is an object of the invention to create an improved clamping chuck. According to a further object of the invention the risk of an escape of the disk from its clamping position specifically under the influence of a high load on the clamped draw bar is excluded or at least substantially decreased while the handle may be manipulated easily.

The improved clamping chuck according to the invention comprises a central receptacle for receiving a draw bar, and a disk member which surrounds the receptacle and which may be moved to a clamping position wherein the draw bar inserted into the receptacle is clamped, and to a releasing position wherein the draw bar is released from being clamped. The disk member comprises a catch mechanism having circumferentially equally spaced catch elements. A blocking means is provided which develops a brake force for preventing movement of the disk member once it is transferred into its clamping position. The amount of developed brake force is made dependent from the amount of an axial load on the draw bar such that a high axial load causes a high brake force and a low load causes a low brake force.

The invention is advantageous therein that the draw bar is held automatically in its clamped position because axial loads on the draw bar produce the necessary brake force preventing a displacement of the disk. Moreover it is advantageous that the disk may be manipulated from the releasing position into the clamping position thereof and vice versa by hand without substantial effort. Specifically, without a load on the draw bar there is no braking effect.

The invention allows for a number of preferred embodiments. The blocking means may be made as an axially operating brake or as a radially operating brake. The axial brake is preferably made such that a brake disk is put upon the disk which is rotatably and axially immovably held within the housing. The brake disk abuts under friction a radial inner surface of the housing and is coupled to an oblique ring ramp of the draw bar. Such coupling may be established by the catch elements which may be balls.

The radial brake made be made preferably such that radially elastic segments are mounted to the disk which abut under friction an axial inner surface of the housing. Each segment is coupled to the oblique ring ramp of the draw bar upon clamping thereof. Such coupling may be realised by the catch elements, which are preferably balls.

The radial brake may be formed from a disk which is only rotatable as well as from a disk which can be moved only axially. In the last mentioned case the disk is connected to a handle which extends through an axial slot in the housing wall. The handle may be manipulated axially.

Apart from the above, preferred embodiments of the invention are defined in the subordinate claims. Embodiments of the invention are described in detail with reference to the appending drawings.

BRIEF DESCRIPTION OF THE DRAWINGS

Embodiments of the invention are described in detail with reference to the appending drawings.

DETAILED DESCRIPTION OF THE INVENTION

Figure 9:
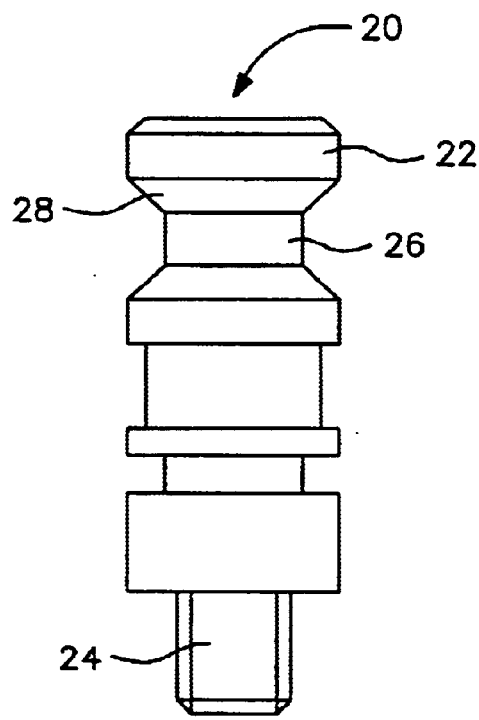
FIG. 9 shows a lateral view on a draw bar.

A clamping chuck designated in its entirety by the reference numeral 1, is screwed upon a base plate 3 by a plurality of bolts 2 which may be a part of a machine tool, e.g. a lathe, a milling machine or an electric erosion machine. A cylindrical housing 5 of the clamping chuck 1 has a central receptacle 10 in form of a through bore through the interior of the housing 5. A draw bar 20 represented in FIG. 1 only in dashed lines and shown in FIG. 9 as an example, may be inserted into the receptacle 10 with its head 22 first. The draw bar 20 has an end 24 opposite to its head 22 to which may be connected either a not shown work piece to be machined or a also not shown work piece holder. An example for a work piece holder is disclosed in U.S. Pat. No 4,855,558 wherein the end 24 of the draw bar is releasably connected to a work piece holder.

A plurality of reference elements are formed on the upper side 6 of the housing 5 which engage counter reference elements provided for at the work piece or the work piece holder in case the draw bar 20 to which the work piece or the work piece holder is connected is completely inserted into the receptacle 10 and clamped therein. The engagement or the abutment, respectively of the reference elements to the counter reference elements results in a precise position in space of the work piece or the work piece holder, respectively, with respect to the clamping chuck 1, which position is normally defined within a rectangular x-, y-, z-coordinate system the z-axis of which coincides with the central line 15 of the receptacle 10. Various reference systems having reference elements and cooperating counter reference elements are known, see e.g. U.S. Pat. Nos. 4,855,558, 5,791,803, European Patent 111 092. Thus, the reference system utilised in the invention need not be described herein in detail. The invention provides for four prismatic pins 11, 12, 13, 14 as reference elements which project from the upper side 6 equally spaced in circumferential direction, i.e. in crosswise arrangement around the receptacle 10. The draw bar 20 cannot be rotated anymore within the receptacle 10 after engagement of the prismatic pins 11, 12, 13, 14 with corresponding counter reference elements provided for at the work piece holder.

Figure 3:
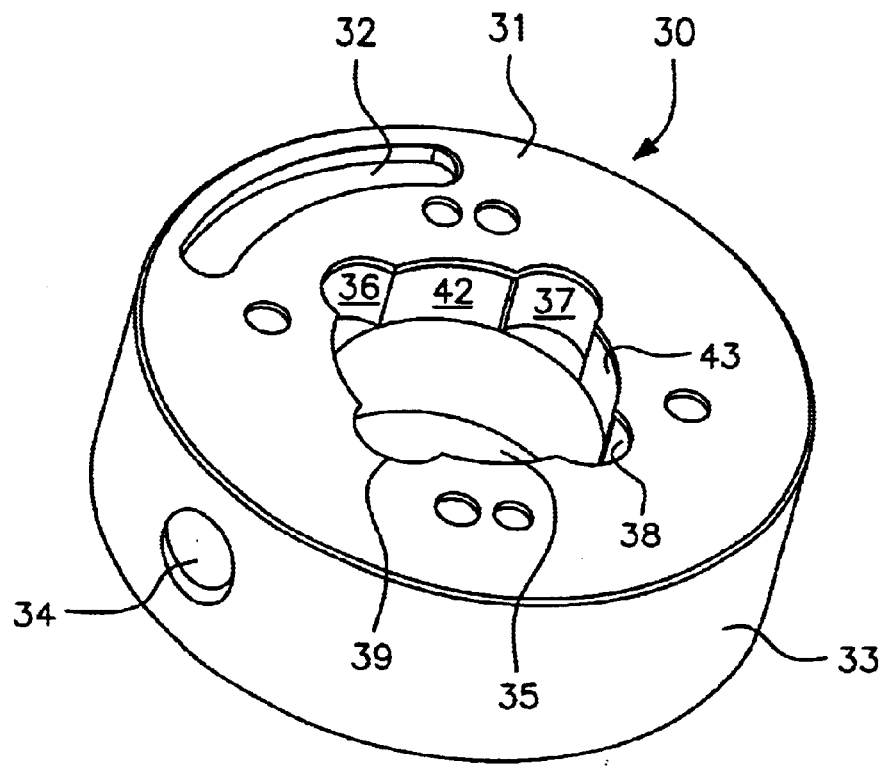
FIG. 3 shows a perspective view on a disk for a ball locking mechanism of the chuck according to FIG. 1.
Figure 4:
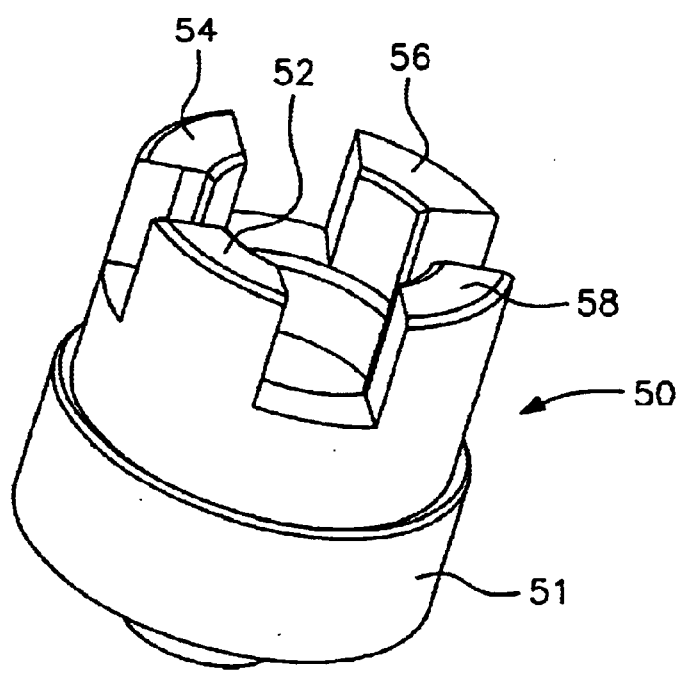
FIG. 4 shows a perspective view of an insert for a disk of a chuck according to FIG. 1.
Figure 5:
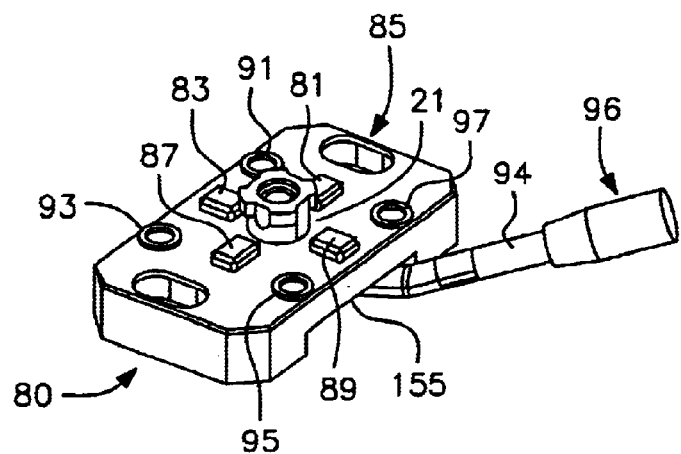
FIG. 5 shows a perspective representation of a chuck according to a second embodiment of the invention.
Figure 6:
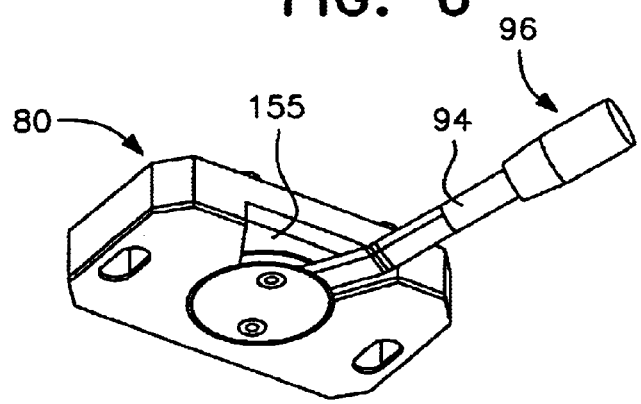
FIG. 6 shows a view from below of the chuck according to FIG. 5.

The clamping device for the draw bar 20 is contained within the inner space of the housing 5 having a U formed cross section. The clamping device comprises a disk 30 which is rotatable within the inner space about the central axis 15 as shown in FIG. 3. An curved slot 32 is cut out of the upper side 31 of the substantially cylindrical disk 30. A pin 9 fixedly mounted to the housing 5 extends into the curved slot 32. Thus, the circumferential length of the curved slot 32 defines that angle within which the disk 30 may be rotated relative to the housing 5. A threadened blind hole 34 extends into the lateral wall 33 of the disk 30 within which the shaft 92 of a handle 90 may be anchored. The shaft 92 extends through a lateral slot 7 cut into a lateral wall 8 of the housing 5 and extending transversely to the central line 15. The disk 30 may be rotated within the mentioned angle about the central line 15 by manipulating the handle 90.

The disk 30 has a central through bore 35 the central axis of which coincides with the central line 15. Four crosswise arranged opposing radial pockets 36, 37, 38, 39 of circular cross section are formed in a portion of the disk 30 adjacent to the upper side 31 thereof around the central bore 35. A radial outer section of each ball 46, 47,48 (the ball for the pocket 39 cannot be seen in the Figures) may find sufficient space in one of the spatially related pockets. Adjacent pockets are connected by a connecting wall, i.e. connecting wall 42 connects pockets 36 and 37, and connecting wall 43 connects pockets 37 and 38. Proceeding in a circumferential direction, each connecting wall starts with a small distance to the central line of the through bore 35 and terminates with a greater distance to the center line thereby forming a curved wedge surface which opens into the pocket at the end of the connecting wall.

An outer ring surface of the upper side 31 of the disk 30 may abut an inner ring surface 4 of the housing 5. There is some clearance between the outer ring surface and the inner ring surface 4 during release of the draw bar. The disk 30 is supported by a retainer ring 16 held in a ring slot 18 of the inner wall of the housing 5.

Figure 1:
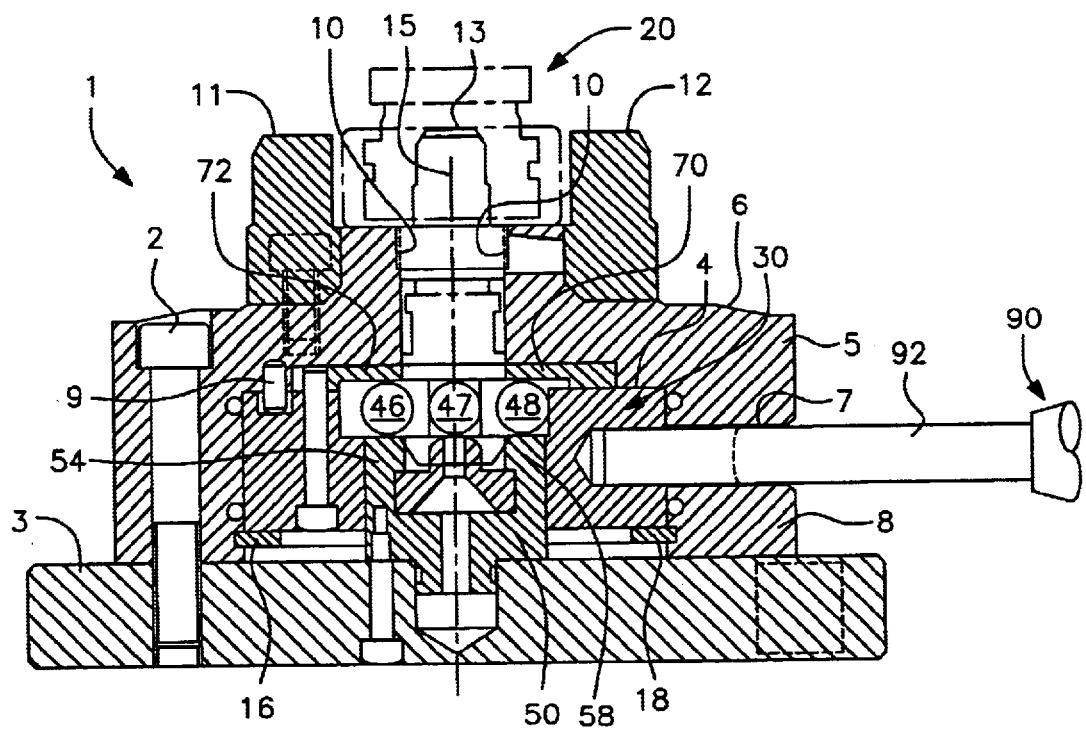
FIG. 1 shows an axial section through a clamping chuck according to a first embodiment of the invention.
Figure 2:
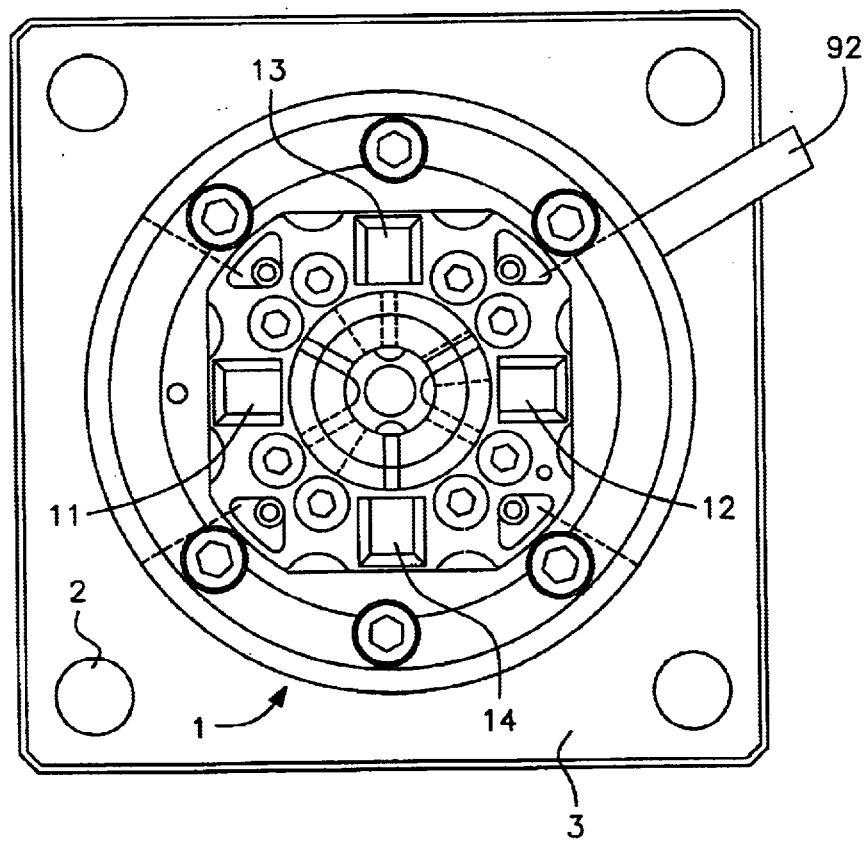
FIG. 2 shows a plan view on the chuck according to FIG. 1.

A supporting structure 50 is fixedly mounted to the base plate 3 and extends into the central through bore 35 of disk 30. Four crosswise arranged supports 52, 54, 56, 58 project from the lower part 51 of the supporting structure 50. In FIG. 1 only supports 54 and 58 may be seen. Each of the supports has a curved outer contour and the plane upper surfaces of all supports 52, 54, 56, 58 extend in a common plane transverse to the central line 15. According to FIG. 1 every one of the balls rest on its associated upper surface of the related support.

A brake disk 70 is mounted upon the upper side 31 of the disk 30. A central hole of the brake disk 70 is aligned to the receptacle 10. Each ball 46, 47, 49 is caught between the under side of brake disk 70 and the upper side of the associated support 52, 54, 56, 58. The upper side of the brake disk 70 abuts an inner brake surface 72 of the housing which surrounds the receptacle 10.

It may now be noted that the disk 30 with pockets 36, 37, 38, 39 and with the connecting walls 42, 43 and the supports 52, 54, 56, 58 and the balls 46, 47, 48 form a locking mechanism for the draw bar 20. The locking mechanism is opened when there is no draw bar in the receptacle and when a draw bar within the receptacle is released. Opening of the locking mechanism is achieved by receipt of each of the balls within its associated pocket which may be caused by rotating the disk 30 into its releasing position by a corresponding manipulation of the handle 90.

In case a draw bar is inserted into the receptacle 10 to such extent that a ring groove 26 extending transverse to the central line 15 and being adjacent to the head 22 opposes the balls 46, 47, 48, the disk 30 may be transferred into the clamping position by a corresponding manipulation of the handle 90. Thereby the balls are urged out of the related pockets and the curved wedge surfaces of the connecting walls urge the balls to proceed into the ring groove 26 until the z-reference surfaces of the clamping chuck 1 engage the counter reference surfaces on the work piece or the work piece holder.

In case an axial pull or an axial load is exerted upon the clamped draw bar during machining of the work piece an oblique ring flank 28 of the ring groove 26 presses the balls 46, 47, 48 against the lower side of the brake disk 70 to the effect that the braking action is increased because of the greater frictional engagement of the brake disk 70 with the braking surface 72 of the housing 5. As the brake disk 70 is fixedly mounted to the disk 30 the latter is also hold strongly in its clamping position and has no chance to escape therefrom if the pull on the draw bar should her increase. From the explained structure according to the invention it can be noted that the clamping force upon the draw bar 20 is proportional to a load or pull on the clamped draw bar which extends parallel to the central line 15. The greater the axial pull on the draw bar tie greater is the braking force acting on the brake disk 70 and the braking surface 72 and preventing any escape of the disk 30 out of the clamping position thereof. The axial force on the clamped draw bar is transferred through the balls 46, 47, 48 to the brake disk 70.

In the second embodiment of the invention the brake preventing undesired automatic adjustment or rotation of the disk of the locking mechanism influenced by an axial pull on the clamped draw bar is a radial one as contrasted to the above described axial brake. Crosswise arranged reference elements 81, 83, 87, 89 for adjusting a work piece or a work piece holder (which are not shown) coupled to a draw bar 21 and z-reference elements project from the upper side of a housing 85 of a clamping chuck 80. The base plate corresponding to the base plate 3 upon which the clamping chuck 80 is bolted is omitted in the drawing. The housing has a central receptacle 110 into which the draw bar 21 may be inserted. The draw bar 21 comprises, adjacent to his head 23, a ring groove 25 which has an outwardly oblique ring surface 27 adjoining the head 23. A disk 130 is accommodated within a u-like recess from the housing 85. The upper portion of disk 130 is formed to a ring 132 the upper side of which abuts a radial shoulder 133 of the housing 85. Below the ring 132 the disk 130 has smaller diameter. Thereby a retainer ring 131 accommodated within a ring groove of the housing may support ring 132 and simultaneous may support the disk 130. Thus the disk 130 is held in the housing 85 such that it cannot be moved axially but may be rotated.

The lower section of the disk 130 is fixedly connected to a shaft 94 of a handle 96 which extends through a lateral cut-out 155 from a wall of the housing 85. The cut-out 155 extends transversely to the center axis 115 of the receptacle 110.

Figure 7:
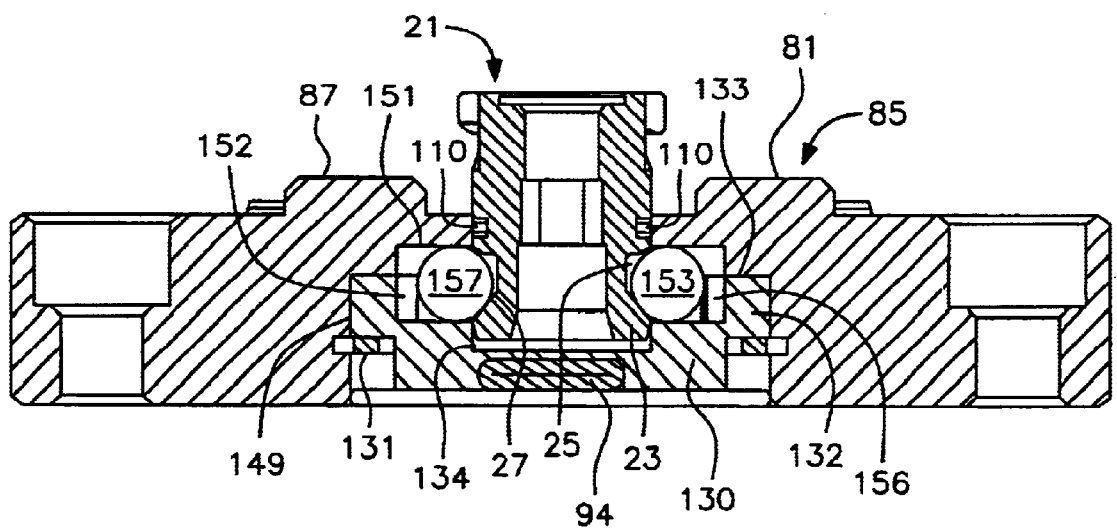
FIG. 7 shows an axial section through the chuck according to FIG. 5.
Figure 8:
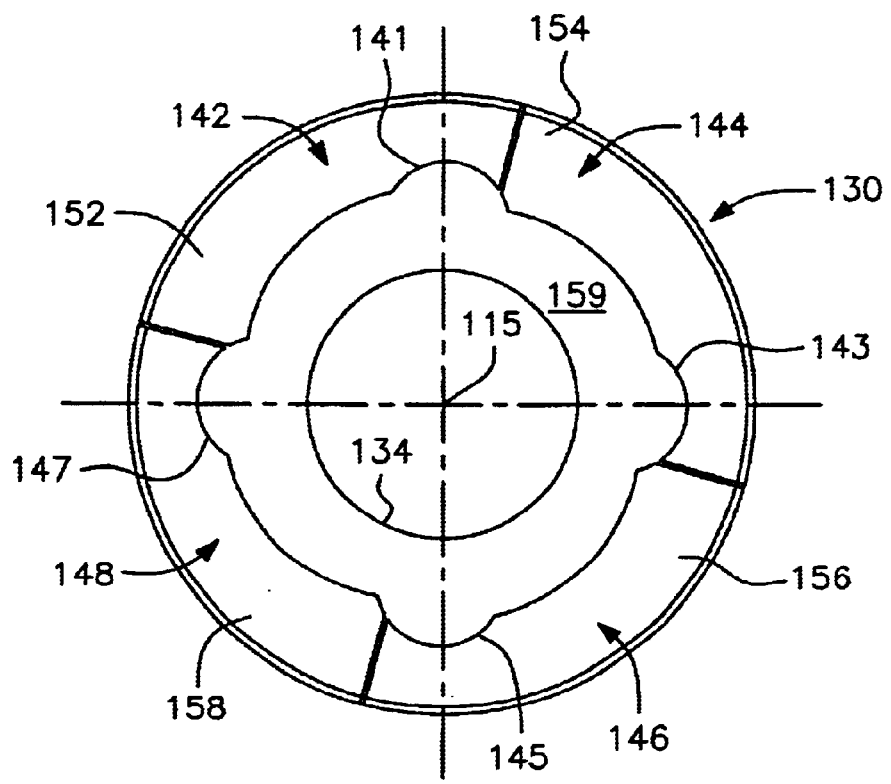
FIG. 8 shows a plan view upon the disk of the chuck according to FIG. 5.

According particularly to FIG. 8 the disk 130 has a central blind hole 134 into which the head 23 of the draw bar 21 may be inserted. The ring 132 is divided into four crosswise arranged segments 142, 144, 146, 148. A front section 152, 154, 156, 158 taken in circumferential direction of each segment is separated from the lower part of the disk 130. Thus, each front section may be deformed elastically and radially. On the other hand, the rearward section of each segment 142, 144, 146, 148 is fixedly connected to the disk 130 and has a recess 141, 143, 145, 147 for receiving the radially outward portion of a ball. In FIG. 7 only the balls 153, 157 for the recesses 143, 147 can be seen. The distance of each front section 152, 154, 156, 158 of each segment 142, 144, 146, 148 to the central line 115 increases when proceeding circumferentially. Therefore, rotation of disk 130 by a corresponding manipulation of the handle 96 in a reverse direction will urge each ball out of the associated recess 141, 143, 145, 147 towards the central blind hole 134.

Every one of the four balls 153, 157 is axially caught between a support surface 159 of the disk 130 for the balls and an opposite internal surface 151 of the housing 85. The angular range within which the handle 96 may be rotated is restricted by the length of the cut-out 155 of the housing and corresponds almost to the length of every one of the segments 142, 144, 146, 148. In case the handle 96 is manipulated to the one of the ends of cut-out 155 the disk 130 is rotated into the clamping position for the draw bar 21. If the handle 96 is manipulated to the opposite end of the cut-out 155 the disk 130 is rotated into the releasing position for the draw bar 21.

Assuming the draw bar 21 is clamped by the clamping chuck 85 according to FIG. 7, the four balls 153, 157 engaging the ring groove 25. In case an axial pull or an axial load is exerted on the clamped draw bar 21 during machining a work piece connected to the draw bar 21 the oblique ring surface 27 urges each of the balls 153, 157 radially outwardly. Consequently, the front sections 152, 154, 156, 158 associated to the balls are urged radially outwardly into frictional engagement with an axial lateral wall 149 of the housing 85. Such engagement will be the greater the greater the pull on the draw bar 21 is. Thus, the radially outward contours of the front sections 152, 154, 156, 158 in cooperation with the wall 149 of the housing 85 form a radial brake preventing an automatic rotational displacement of the disk 130 under an influence of said pull so that it cannot escape its clamping position. It will be seen that that amount of the brake force is proportional to the amount of axial pull on the draw bar 21. Therefore, the draw bar 21 is self-blocked against a release out of its clamping during machining of a work piece connected to it.

Figure 10:
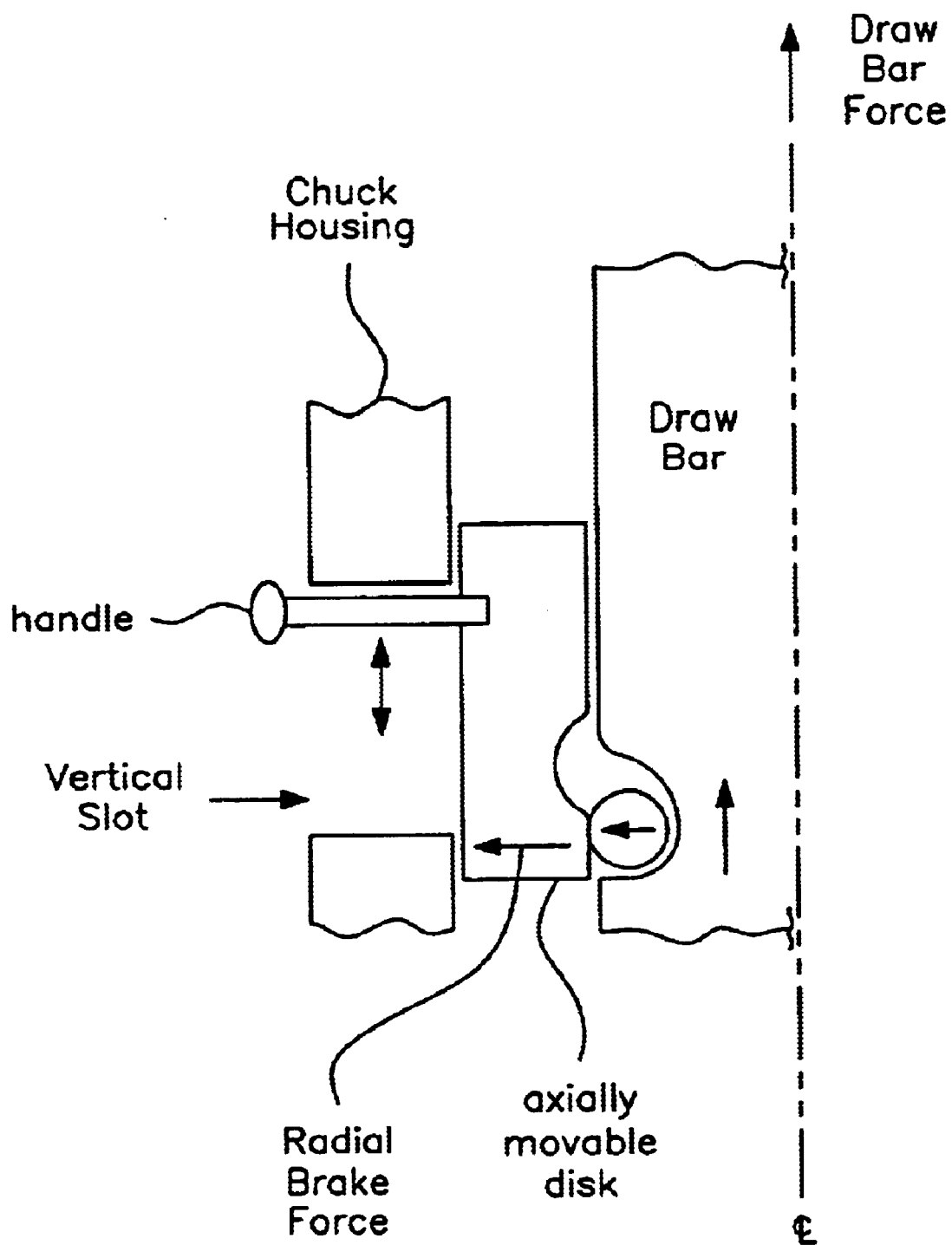
FIG. 10 shows a schematic view of a third embodiment of the invention.

A third embodiment of the invention, shown schematically in FIG. 10, proceeds from the clamping means disclosed in the U.S. Pat. No. 4,855,558 for a draw bar according to FIG. 9. That known clamping means may be transferred to a mechanically adjustable clamping means according to the invention thereby that the known axially movable disk is equipped with a handle extending through a vertical slot cut into the chuck housing and with radially elastic sections as part of a radial brake corresponding to the front sections 152, 154, 156, 158 according to the invention. The second part of the radial brake will then be an axial inner wall of the housing of the chuck. The invention, therefore, is not restricted to disks like disks 30 and 130, which cannot be moved axially but may be rotated. Instead, the invention may also be carried out with a radial brake in a clamping chuck having a vertically movable disk as disclosed in the last mentioned document.

What is claimed is:

1. A clamping chuck having a housing with a central receptacle defining a central axis for receiving a draw bar, and a disk having a central bore which is arranged around the receptacle and movable from a clamping position, wherein a draw bar axially inserted into the receptacle is clamped, to a releasing position, wherein a draw bar is released from being clamped, said disk including a locking mechanism comprising a plurality of locking elements spaced equally apart in a circumferential direction and a brake for coupling with a draw bar such that the brake force of the brake is proportional to an axial pull on the draw bar, said brake being axially operable and including a radially extending braking surface provided at the disk frictionally abutting a surface of said housing, said braking surface movable axially against said surface when the draw bar is clamped.

2. The clamping chuck according to claim 1 wherein said radially extending braking surface comprises an upper surface of a brake disk.

3. The clamping chuck according to claim 1 wherein said locking mechanism includes radially displaceable balls.

4. The clamping chuck according to claim 1 wherein said disk is axially immovable.

5. The clamping chuck according to claim 1 wherein said disk is coupled with a handle projecting outwardly through a slot in the housing, wherein said handle may be movable such that the disk may be moved between the releasing position and the clamping position.

6. The clamping chuck according to claim 1 further comprising reference elements provided on a lower side of the housing for adjusting a work piece or a work piece holder fixedly connected to a draw bar to an exact position in space with respect to the clamping chuck.

7. A clamping chuck having a housing with a central receptacle defining a central axis and a disk having a central bore which is arranged around the receptacle and movable from a clamping position, wherein a draw bar axially inserted into the receptacle is clamped, to a releasing position, wherein a draw bar is released from being clamped, said disk including a locking mechanism comprising a plurality of locking elements spaced equally apart in a circumferential direction, and a brake for coupling with a draw bar such that the brake force of the brake is proportional to an axial pull on the draw bar, said brake being radially operable and including axially extending braking surfaces provided at radially elastic sections of the disk which frictionally abut axially oriented surfaces of said housing, said braking surfaces provided at the radially elastic sections movable radially against said axially oriented surfaces when the draw bar is clamped and pulled axially.

8. The clamping chuck of claim 7 wherein said locking mechanism includes radially displaceable balls.

9. The clamping chuck of claim 7 wherein said disk is axially immovable.

10. The clamping chuck of claim 7 wherein said disk is coupled with a handle projecting through a slot in said housing, wherein said handle may be movable such that the disk may be moved between the releasing position and the clamping position.

11. The clamping chuck of claim 7 wherein the disk is axially movable and radially immobile, said disk coupled to an axially movable handle extending through the housing.

* * * * *